United States Patent [19]

Otouma et al.

[11] 4,018,964

[45] Apr. 19, 1977

[54] METHOD FOR PREPARING GLASSY FIBER HAVING PROTUBERANCES STUDDED ON THE SURFACE USEFUL FOR REINFORCEMENT AND RESULTING PRODUCT

[75] Inventors: Takashi Otouma; Susumu Aoki, both of Yokohama; Toshiaki Minaki, Yamato-kooriyama; Kenichi Shibata, Nara; Kentaro Mori, Tokyo, all of Japan

[73] Assignee: Nippon Asbestos Company, Ltd., Tokyo, Japan

[22] Filed: July 23, 1974

[21] Appl. No.: 491,499

[30] Foreign Application Priority Data

July 27, 1973 Japan .............................. 48-83984
July 27, 1973 Japan .............................. 48-83985

[52] U.S. Cl. .................................... 428/372; 65/2; 65/6; 65/8; 264/167; 428/399
[51] Int. Cl.² ......................................... C03B 37/04
[58] Field of Search .......... 161/174, 179; 264/167; 65/1, 2, 6, 8, 5, 105; 428/399, 372

[56] References Cited

UNITED STATES PATENTS

| | | | |
|---|---|---|---|
| 2,150,945 | 3/1939 | Slayter | 65/8 |
| 2,215,150 | 9/1940 | Hannen | 161/174 X |
| 2,571,457 | 10/1951 | Ladisch | 65/5 |
| 3,684,474 | 8/1972 | Chisholm | 65/105 |
| 3,812,004 | 5/1974 | Chinai et al. | 428/372 X |
| 3,953,185 | 4/1976 | Aoki et al. | 65/8 |

*Primary Examiner*—Robert L. Lindsay, Jr.
*Attorney, Agent, or Firm*—Wenderoth, Lind & Ponack

[57] ABSTRACT

This invention relates to a method for preparing glassy fibers having protuberances studded on the surface of the fiber, characterized in that each protuberance comprises an unmelted component of the starting materials and is formed on the surface of the fiber by fiberizing the partially unmelted starting materials by a spinner or blowing technique.

9 Claims, No Drawings

METHOD FOR PREPARING GLASSY FIBER HAVING PROTUBERANCES STUDDED ON THE SURFACE USEFUL FOR REINFORCEMENT AND RESULTING PRODUCT

This invention relates to a method for preparing improved glassy fibers useful as a reinforcing material for building materials and other industrial materials such as gypsum boards, slates, magnesium carbonate thermal insulations, calcium silicate boards, and the like.

Recently, glassy fibers have been used in place of asbestos fibers as a reinforcing material for gypsum boards, slates, magnesium carbonate thermal insulations, calcium silicate materials, and the like. However, these glassy fibers have the disadvantage that it is hard to make a physically strong bond between the fibers and a matrix since the surface of the fibers is smooth and chemically inactive. Therefore, when stress is imparted to a product, "slippage" is caused at the intersurface between the matrix and the fibers, and due to this slippage the stress is not well conducted from the matrix to the fibers. Consequently, the physical strength of the product is not large.

In order to increase the physical strength of the product, it is necessary to use a large amount of glass fiber. This is not reasonable from the point of manufacturing cost and, besides, it is considerably harder to uniformly disperse such a large amount of glass fiber into a matrix.

An object of this invention is to provide improved glassy fibers which do not have the above-mentioned disadvantages.

When glassy fibers having protuberances studded on the surface of the fiber prepared in accordance with this invention are used as a reinforcing material, it is possible to make a physically strong bond between the fibers and the matrix since slippage does not occur at the intersurface between the fibers and the matrix, and any stress imparted to a product is efficiently conducted to the fibers. Thus, the physical strength of the product is improved.

When the glassy fibers of this invention are used as a reinforcing material, an amount of ½–⅔ of the amount of the conventional glassy fibers is sufficient to provide a product of practical strength. The manufacturing cost is therefore decreased, and incorporation of the glassy fibers in a matrix becomes easy.

The glassy fibers of this invention are characterized by having protuberances studded on the surfaces of the fibers. The proturberances studded on the surfaces of the fibers are formed during the manufacturing step by drawing starting materials from a furnace while they are still partially unmelted and fiberizing the materials to make the unmelted portions protrude from the surfaces of the fibers.

In order to have a part of the starting materials unmelted, it is necessary to control the working temperature and time, and to properly select the starting materials.

Furnaces used to melt the starting materials in accordance with this invention generally include arc-furnaces, gas-furnaces, cupola-furnaces and the like. Among these, an arc-furnace is not the most preferred since the working temperature of the arc-furnace is a little too high to produce a melt having sufficient unmelted parts, and consequently it is hard to produce glassy fibers having the desired protuberances. On the other hand, the working temperature of both a gas-furnace and a cupola-furnace is low enough to produce a melt having the desired amount of unmelted parts, and consequently it is easy to produce glassy fibers having the desired protuberances. Particularly, by means of a cupola furnace, it is possible to increase the amount of unmelted particles in a melt since the working time from the step of charging of the starting materials to the step of pouring the melt is relatively short.

The starting materials and their particle sizes are selected so as to have a proper fusibility in view of the fusing temperature and working time.

The starting materials of this invention are selected from those used to make conventional mineral fibers such as rock fibers, glass fibers and the like.

We have found that glassy fibers having protuberances studded on the surface of the fiber can be obtained by adding a protuberance-forming material to the starting materials of the conventional mineral fibers.

Suitable protuberance-forming materials include zirconia, zircon-sand, disapore, fuesed alumina and the like, which are relatively hard to melt. Among these, fused alumina easily provides the desired unmelted particles since the texture of fused alumina is relatively dense and its crystallization is well developed.

An amount of the protuberance-forming material should previously be calculated in view of the composition of the starting materials. This amount is closely related to the number of protuberances appearing on the surface of fibers, and should therefore be strictly controlled. An excess amount of the protuberance-forming material results in an adverse effect, that is, lowering strength of fibers. Accordingly the amount of the protuberance-forming material used is preferably 5 – 25 parts by weight per 100 parts of the main components, and their preferable particle size is 30 – 400 mesh. A part of the thus added protuberance-forming material is melted during processing, and the other part remains unmelted. The volume of the protuberances of the final product thus produced is usually 0.1 – 3% of the body of the fibers..

A desired degree of protuberances is determined on the basis of working time, working temperature, particle size, amount used, composition of starting material, type of furnace and the like.

We have also found that in order to provide chemically resistant (for example alkali-resistant) glassy fibers it is necessry to incorporate zirconia ($ZrO_2$) with glass fibers in an amount of more than 7% by weight, preferably more than 10% by weight as a uniform glass phase. A suitable mineral for providing a $ZrO_2$ is zirconia or zircon-sand ($ZrO_2$-$SiO_2$). As mentioned above, this is also a suitable material to provide protuberances on the surface of fibers. Therefore, the amount of zirconia or zircon-sand to be added must be controlled so as to provide the desirable protuberances, while the content of melted zirconia in the melt of the starting materials must be more than 7% by weight.

The present invention is further illustrated by the following Examples.

EXAMPLE 1

| Components | Composition (% by weight) |
| --- | --- |
| $SiO_2$ | 36.0 |
| $Al_2O_3$ | 15.5 |

-continued

| Components | Composition (% by weight) |
|---|---|
| MgO | 6.8 |
| CaO | 38.6 |
| $Fe_2O_3$ | 0.7 |
| MnO | 1.9 |
| $Na_2O$ | 0.5 |

Silica stone, Kaolin, dolomite, lime stone and cement were mixed so as to give the above composition (Mixture-A). To 100 parts by weight of this Mixture-A was added 10 parts by weight of fused alumina having a particle size of 65 – 100 mesh (Mixture-B). The two Mixtures A and B were respectively formed into bricks each 50 × 50 = 80 mm, and the bricks were melted in a cupola furnace at 1450°C for about 10 minutes. The melt was then taken out from the furnace as a stream having a diameter of about 30 mm, and was fiberized by means of a well known spinner method. The fibers of Mixture-A had an average size of 4.5 $\mu$, and the fibers of Mixture-B had an average size of 4.7 $\mu$. According to observation by a microscope, the fibers of Mixture-A had no protuberances, while the fibers of Mixture-B had protuberances, having a size twice as large as the diameter of the fibers at intervals of 1 – 2 mm along each fiber. The average tensile strength of fibers of Mixture-A was about 105 kg/mm$^2$, while that of fibers of Mixture-B was almost the same, that is, about 100 kg/mm$^2$. The unmelted components included in the protuberances on the surface of fibers of Mixture-B were all alumina, and had a diameter of about 4 – 4.5 $\mu$. Fiberizing of both fibers was equally favourable.

The above prepared two types of fibers were respectively mixed with $\beta$-hemihydrate gypsum in an amount of 5% by weight, and the resultant mixtures were cured by a hydration reaction to obtain boards, (thickness = 10 mm) having a dry density of 0.8/cm$^3$. The modulus of rupture of the two boards was tested, and the results are shown in Table 1. As a comparative sample, a board prepared in the same manner as above by using C-glass fibers (fiber length = 2.5 cm) was tested.

Table 1

|  | Modulus of Rupture (kg/cm$^2$) |
|---|---|
| Board prepared using Mixture-A fibers | 18 |
| Board prepared using Mixture-B fibers | 33 |
| Board prepared using C-glass fibers* | 20 |

*C-glass fibers are fibers with considerable chemical resistance, especially to acids, which are used for making separators in storage batteries, retainers or filter cloths and which have the chemical composition: 65 % by weight SiO$_2$; 4.0 % by weight Al$_2$O$_3$; 14.0 % by weight CaO; 3.0 % by weight MgO; 5.0 % by weight B$_2$O$_3$; 8.0 % by weight Na$_2$O; 1.0 % by weight K$_2$O.

It is obvious from the data shown in Table 1 that protuberances formed on the surface of fibers prepared by using Mixture-B contribute to the increase in the strength. Observing the ruptured sections of these boards after the tests, with regard to the board of Mixture-A fibers, many fibers projected from the matrix, while with regard to the board of Mixture-B fibers there was no projection of fibers but the fibers were regularly cut together with the matrix at the point of the load. This proves that there was no slippage with regard to the Mixture-B fibers, and that the matrix was reinforced by glass fibers.

EXAMPLE 2

| Components | Composition (% by weight) |
|---|---|
| $SiO_2$ | 42.0 |
| $Al_2O_3$ | 14.0 |
| MgO | 23.5 |
| $ZrO_2$ | 13.5 |
| $B_2O_3$ | 5.0 |
| $Na_2O$ | 2.0 |

Silica stone, alumina, zircon-sand, magnesia clinker, soda-ash and borax were mixed so as to give the above composition, and the resultant mixture was formed into bricks 50 = 50 = 80 mm. The bricks were then melted in a cupola furnace at 1320° C for about 7 minutes. The particle size of the zircon-sand used was 65 – 170 mesh. The melt was then taken out from the furnace as a stream having a diameter of about 30 mm. and was fiberized by means of a spinner method. The fibers thus obtained had an average diameter of 5.2 $\mu$, and had many protuberances. The protuberances had a size twice as large as the diameter of the fiber, and were located at intervals of 1 – 2 mm along each fiber. The unmelted particles included in the protuberances had a diameter of about 4.5 – 5.0 $\mu$, and most of them were zircon-sand.

In comparison, starting materials having the same composition as above were melted in a three-phase arc-furnace until the materials were completely melted without leaving any unmelted part. The melt was then cooled to 1390° C, and was fiberized by means of a spinner method. The fibers thus obtained had no protuberances.

The above prepared two types of fibers were tested as reinforcing material in preparing calcium silicate thermal insulation. That is, 8 parts of the above two types of fibers were respectively stirred in 1000 parts of water to uniformly disperse them in the water. The dispersion was then mixded with 40 parts of diatomaceous earth, 40 parts of slaked lime and 12 parts of bentonite to produce a homogeneous slurry. The slurry was heated at 90° C for about 2 hours to form a gel and then the gel was dehydrated and molded into a formed product. The formed product was subjected to hydrothermal treatment in an autoclave for 7 hours under a saturated steam pressure of 9 kg/cm$^2$ thereby causing a hardening reaction. The product thus hydrothermally treated was dried to produce a calcium silicate thermal insulation.

The thermal insulations were tested for density, modulus of rupture in the ordinary state and modulus of rupture after they were heated at 650° C. The test results are shown in the following Table 2.

Table 2

|  | Thermal insulation reinforced by fibers of an average diameter of 5.2 $\mu$ having protuberances | Thermal insulation reinforced by fibers of an average diameter of 5.0 $\mu$ having no protuberances |
|---|---|---|
| Density (g/cm$^3$) | 0.19 | 0.19 |
| Modulus of rupture (kg/cm$^2$) in the ordinary state | 8.8 | 6.7 |
| Modulus of rupture (kg/cm$^2$) after | 5.3 | 4.6 |

Table 2-continued

| | Thermal insulation reinforced by fibers of an average diameter of 5.2 μ having protuberances | Thermal insulation reinforced by fibers of an average diameter of 5.0 μ having no protuberances |
|---|---|---|
| heating at 650° C | | |

It is clear from the data shown in Table 2 that protuberances contribute to the increase in strength. The observation of the ruptured sections of these boards after the tests showed the same phenomena as in Example 1. That is, there was no slippage with regard to the fibers having protuberances, and this proves that the matrix was effectively reinforced.

As mentioned above, glass fibers having protuberances studded on thier sufaces according to this invention can be used for reinforcing building materials and other industrial materials such as gypsum boards, calcium silicate boards and the like.

The glass fibers of this invention are used effectively in the following weight ratios (% by weight):

| | | |
|---|---|---|
| Fibers of this invention | : | calcium silicate |
| = 5 – 30 | : | 95 – 70 |
| Fibers of this invention | : | concrete |
| = 5 – 15 | : | 95 – 85 |
| Fibers of this invention | : | gypsum |
| = 5 – 15 | : | 95 – 85 |
| Fibers of this invention | : | magnesium carbonate |
| = 5 – 30 | : | 95 – 70 |

Although the present invention has been described with certain specific embodiments, it is to be understood that modifications and variations may be resorted to without departing from the spirit and scope of this invention as those skilled in the art will readily understand. Such modifications and variations are considered to be within the purview and scope of the appended claim.

We claim:

1. A method of preparing glass fiber having protuberances studded in the fiber for use as a reinforcing material, which comprises
   mixing 100 parts by weight of glass fiber components with 5–25 parts by weight of a protuberance-forming substance selected from the group consisting of zirconia, zircon-sand, disapore and fused alumina,
   heating the mixture in a cupola furnace at a temperature of 1320°–1450° C, and
   fiberizing the resultant melt, containing both unmelted and melted portions of the protuberance-forming substance, by a spinner of blowing technique to form glass fiber having protuberances studded in the fiber in a volume of 0.1–3.0% based on the volume of the body of the fiber.

2. The method according to claim 1, wherein the protuberance-forming substance is fused alumina.

3. The method according to claim 1, wherein the protuberance-forming substance is zircon-sand.

4. A glass fiber having protuberances studded in the fiber in a volume of 0.1–3.0% based on the volume of the body of the fiber, the protuberances containing both melted and the unmelted portions of a protuberance-forming substance selected from the group consisting of zirconia, zircon-sand, diaspore and fused alumina.

5. The method according to claim 1, wherein the particle size of the protuberance-forming substance is 30 – 400 mesh incorporated in the mixture.

6. The fiber according to claim 4, wherein the diameter of the protuberances is twice as large as the diameter of the body of the fiber.

7. The fiber according to claim 4, wherein the protuberances occur at intervals of 1 – 2mm along the surface of the fiber.

8. The fiber according to claim 4, wherein the unmelted substance has a diameter of about 4 – 4.5μ.

9. The fiber according to claim 4 wherein the protuberance-forming substance has a diameter of about 4.5 – 5.0μ.

* * * * *